United States Patent [19]

Prasse et al.

[11] E Re. 31,005

[45] Reissued Aug. 3, 1982

[54] RESILIENT PLASTIC PISTON RING

[75] Inventors: Herbert F. Prasse, Town and Country; Harold E. McCormick, Ballwin, both of Mo.

[73] Assignee: Ramsey Corporation, St. Louis, Mo.

[21] Appl. No.: 98,928

[22] Filed: Nov. 30, 1979

Related U.S. Patent Documents

Reissue of:

[64] Patent No.: 3,608,911
Issued: Sep. 28, 1971
Appl. No.: 16,278
Filed: Mar. 4, 1970

[51] Int. Cl.[3] ..... F16J 9/00; F16J 9/20

[52] U.S. Cl. ..... 277/138; 277/136; 277/165

[58] Field of Search ..... 277/138, 139, 140, 141, 277/27, 192, 193, 58

[56] References Cited

U.S. PATENT DOCUMENTS

| | | | |
|---|---|---|---|
| 2,456,529 | 12/1948 | Naab | 277/165 |
| 2,745,704 | 5/1956 | D'Errico . | |
| 2,893,796 | 7/1959 | Howlett et al. | 277/223 |
| 3,108,817 | 10/1963 | Hughes | 277/223 |
| 3,268,235 | 8/1966 | Jacobellis | 277/165 |
| 3,418,001 | 12/1968 | Rentschler et al. | 277/165 |

FOREIGN PATENT DOCUMENTS

| | | |
|---|---|---|
| 1540312 | 1/1969 | France . |

*Primary Examiner*—Robert I. Smith
*Attorney, Agent, or Firm*—Yount & Tarolli

[57] ABSTRACT

A plastic ring for internal combustion engine pistons. In a preferred embodiment, the ring has a flat outer diameter adapted to engage the inner diameter of a compression piston ring and an inner diameter adapted to engage the backwall of the ring groove. An axial groove slightly spaced from the outer diameter extends into the ring from the top thereof, whereby combustion gases will expand the ring so that it acts as a circumferential expander for the compression ring while preventing blowby of gases through the ring groove. In another modification, the ring is used with its outer diameter acting against the cylinder wall.

7 Claims, 14 Drawing Figures

RESILIENT PLASTIC PISTON RING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to internal combustion engines and more particularly to a piston ring for use in such engines.

2. Prior Art

Recently, more emphasis has been placed upon controlling internal combustion engine emissions. It has been determined that a significant quantity of undesirable emissions as well as power loss are the result of combustion blowby. Such blowby occurs between the outer diameter of the piston and the cylinder wall. While compression rings, carried by the piston in ring grooves, have been used to seal this space, the prior art rings and ring sets do not completely seal the firing chamber.

Blowby can still occur between the outer diameter of the piston ring and the cylinder wall, or by a gas flow around the piston ring in the ring groove. It has been suggested to overcome the first form of blowby by placing expansion springs in the ring groove to force the piston ring into tighter contact with the cylinder wall. Such expansion springs, while helpful, increase the friction of the piston ring against the cylinder wall at all times by applying a continuous pressure to the inner diameter of the piston ring.

It has been further suggested that the piston ring be made substantially L-shaped, as in the U.S. Pats. to R. S. Moore, No. 1,159,066 and Goetze, No. 2,844,424, with one leg of the L engaging the cylinder wall while the other leg is retained in the ring groove. In such constructions, the force of the entrapped combustion gases is used to expand, circumferentially, the first leg into tighter engagement with the cylinder wall. While such rings may be effective in reducing blowby between the ring and the cylinder wall, they are not effective in preventing the escape of such gas through the ring groove. Further, because such rings are historically of split annular construction, a considerable amount of gas can escape in the area of the ring gap.

SUMMARY OF THE INVENTION

Our invention overcomes the disadvantages of the prior art by providing a resilient plastic piston ring which utilizes the pressure of the entrapped gas to expand the main piston ring into tighter sealing engagement with the cylinder wall while at the same time expanding a portion of the ring into greater sealing contact with the ring groove walls whereby escape is prevented at both the interface between the piston ring and the cylinder wall and the interface between the ring and the groove walls. Because the ring relies upon the pressure of entrapped gas to provide the expansion force, friction is reduced during those portions of the engine cycle while either the pressure retained is reduced, as during exhaust, or where there is no pressure retained as during intake.

In a preferred embodiment, the ring is slightly U-shaped with one leg of the U being radially thinner and axially shorter than the other. The ring is bottomed in the ring groove and is utilized as a backing for a standard piston ring. The opening of the U opens axially upwardly and compressed gases seeking exit through the ring groove will be forced into the bight resulting in a radial expansion of the ring by pressing the legs of the U further apart. This will at the same time seat the ring more firmly against the backwall and bottom wall of the ring groove while increasing its expansion pressure against the piston ring.

In another preferred embodiment, the expansion ring has grooves in both the top and bottom faces and a circumferential groove in the internal diameter face. The external diameter face is planar and abuts the internal diameter of a standard composition piston ring or of a ring pair.

In yet another embodiment, the resilient plastic piston ring of this invention is used without a standard piston ring and has its outer diameter adapted to contact the cylinder wall. The ring is seated against the bottom of the ring groove and is preferably used in a groove immediately adjacent the top of the piston to control blowby or may be used in a lower groove, in an inverted position, to function as an oil control ring.

In yet another embodiment, the ring is bottomed in the ring groove and has a slanted outer diameter face adapted to engage the cylinder wall, a portion of the outer periphery extending below the normal ring groove depth in a secondary curved cutback groove.

In each instance the ring is preferably made of a high-temperature resilient plastic such as Vespel (Reg. trademark of E. I. du Pont de Nemours & Co. for a polyimide resin), Teflon (Reg. trademark for a polytetrafluoroethylene manufactured by E. I. du Pont de Nemours & Co.), or one of the high-temperature aromatic polyimides. Although the ring is preferably a 360° continuous ring, specific materials may require the use of a split ring for specific applications.

In those instances where the plastic ring does not contact the wall of the combustion cylinder, in addition to the above-mentioned high-temperature plastics, a high-temperature fluoroelastomer may be used such as Viton (Reg. trademark of E. I. du Pont de Nemours & Co. for a fluoroelastomer).

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 8:
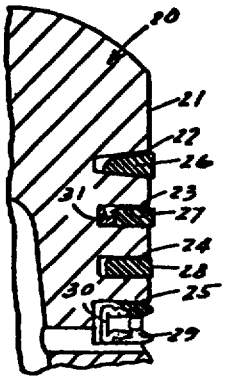
FIG. 8 is a view similar to FIG. 7, illustrating the ring of FIG. 1 as received in a piston.

FIG. 8 fragmentarily illustrates a piston 20 of the type such as is used in internal combustion engines, especially diesel engines and the like. The piston 20 has a head portion 21 equipped with a plurality of circumferential grooves 22, 23, 24 and 25. The grooves receive piston rings which project outwardly therefrom to provide a seal between the piston and the cylinder in which the piston is received. The rings may be of the compression type such as the rings 26, 27, and 28 or may be oil control rings such as the ring 29.

In the view illustrated, the ring 26 is illustrated as being a torsion twist keystone ring received in a wedge-shaped groove, the ring 27 is illustrated as being a conventional rectangular compression ring with a coated wear face received in a rectangular groove 23, and the ring 28 is illustrated as being a bevelled-faced compression ring with a wear coated face also received in a rectangular groove 24. The oil control ring 29 illustrated is a one-piece U-shaped ring expanded by a circumferentially expanding spring 30.

Although many advances have been made in the design of the piston rings, with the increasing use of high-performance engines and the increasing combustion pressures encountered therein, conventional piston rings still allow a significant amount of combustion gases to escape from the combustion area by traversing the path between the piston head and cylinder wall. Some of this escapage occurs between the outer diameter of the rings and the cylinder wall. A large amount also occurs by passage of gas around the piston ring in the ring groove. It is the purpose of this invention to minimize such gas blowby.

In order to effectuate this purpose, in the embodiment illustrated in FIG. 8, a plastic piston ring 31, according to this invention, is placed in a ring groove behind the conventional piston ring. The ring 31 is illustrated as being placed in the ring groove 23 behind the compression ring 27.

Figure 1:
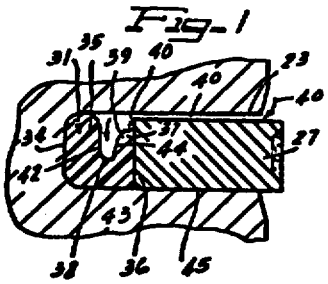
FIG. 1 is a fragmentary cross-sectional view of the piston ring of this invention illustrating the ring seated in a ring groove behind a standard compression piston ring.

FIG. 1 is an enlarged fragmentary view of the ring groove 23 and rings 27 and 31. In accordance with the customary practice, the groove is axially taller and radially deeper than the conventional piston ring 27 so that the ring may be movable therein.

The ring 31 is positioned radially inwardly of the ring 27, and is preferably bottomed against the backwall 34 of the groove 23. The radially inner portion 35 of the ring preferably has a axial height approximately the same as the axial height of the groove 23. The front or outer diameter face 36 of the ring rides against the inner diameter 37 of the ring 27 and has an axial height less than the axial height of the inner diameter portion 35. An axially extending groove 38 projects into the ring between the radially outer portion 39 and the radially inner portion 35 with the inner portion being slightly thicker in a radial direction than the outer portion.

The groove 38 tapers axially upward and radially outward to a point 40 either at or in close-spaced relation to the radially outer face 36. [It is to be understood that although the ring 31 is illustrated as having its radially inner portion 35 thicker than the radially outer face 36.] It is to be understood that although the ring 31 is illustrated as having its radially inner portion 35 thicker than the radially outer portion 39, the two being separated by the groove 38, that this is a matter of design and that in specific embodiments the thicknesses may be varied. Further, it is to be understood that the dimensions of the rings 31 are set so that it may be inserted into the ring groove behind the compression ring 27 in such a manner that it will not adversely affect correct installation of the ring 27. It will further be understood that the ring 31 may be assembled with a clearance relationship between its innner diameter and the backwall of the groove or between its outer diameter and the back of the ring 27 so as to allow the ring 27 to be compressed when inserted into the cylinder. In this manner, the normal circumferential expansion force of the ring 27 against the cylinder wall is preserved.

The ring 31 is constructed of a high-temperature plastic and preferably of plastics such as the polyimides which are relatively stable at the temperature encountered in an internal combustion engine. An acceptable plastic for use in constructing the ring 31 is known as Vespel, a registered trademark of the du Pont corporation. Such plastics are capable of continuous operation of temperatures of up to 500° F. and intermittent temperature exposures up to 900° F.

The ring is preferably constructed of material which has an elastic memory so that the ring may be constructed as a continuous 360° ring. When so constructed, the ring is stretched to be fittable over the piston head and thereafter shrunk to its normal diameter within the ring groove. In lower ring groove applications, plastic materials such as Teflon (a registered trademark of the E. I. du Pont de Nemours & Co.) may be utilized. Where the elastic memory of the material is such as to be undesirable for the stretching and shrink fit insertion into the ring groove, the ring may be split to facilitate installation. It is to be understood that although different materials may be used, the preferred material is a material such as Vespel or Viton. Viton is a fluoroelastomer which in commercial embodiments such as Viton A or Viton B exhibits the desired properties of high-temperature stability and flexibility. Further, the material must be resilient at the operating temperatures encountered in the ring groove and should have self-lubricating properties.

In the absence of pressure acting on the ring 31, the ring exerts little cicumferential expansion force against the compression ring 27. However, during combustion, high-pressure gases flow into the ring groove 23 as illustrated by the arrows 40. The high-pressure gas will flow into the groove 38 where it will act equally against the radially inner wall of the groove 42, the radially outer wall of the groove 44 and the bight of the groove 43. This action will cause an expansion of the resilient material ring by increasing the radial depth of the groove. In this manner, the radially inner portion 35 will be pressed into tighter engagement with the bottom of the ring groove to prevent escape of compression gas around the inner diameter of the ring 31. The action of the gas against the bight portion 43 of the groove will force the ring 31 into tighter sealing engagement with the bottom wall 45 of the ring groove, thereby aiding in preventing flow of the compression gas around the ring 31. The pressure of the gas against the outer diameter wall 44 of the groove will act to force the outer diameter wall 36 of the ring 31 against the inner diameter wall 37 of the compression ring 27. This will create a circumferential expansion force against the compression ring 27 to increase the sealing pressure between the compression ring and the cylinder wall. This pressure also increases the sealing pressure between the outer diameter wall 36 of the ring 31 and the inner diameter wall 37 of the ring 27, thereby preventing flow of gas between the two rings.

It can therefore be seen that the compression gases will be effectively trapped within the ring groove in such a manner that leakage paths within the groove are blocked by a sealing force which is proportionate to the pressure of the gas. This will reduce or eliminate blowby through the ring groove while at the same time reducing blowby between the compression ring face and the cylinder wall by increasing the expansive force of the compression ring against the cylinder wall in direct response to the increase of compression gas pressure. Because the ring 31 is resilient, it is able to accommodate the radial expansion caused by relative movement between the radially inner portion 35 and the radially outer portion 39. Further, due to its resiliency, when the pressure of the compression gases is reduced, as during the intake cycle of a four-cycle engine, the ring 31 will resume its initial shape reducing circumferential force against the compression ring 27 and thereby lessening friction between the compression ring 27 and the cylinder wall.

Figure 2:
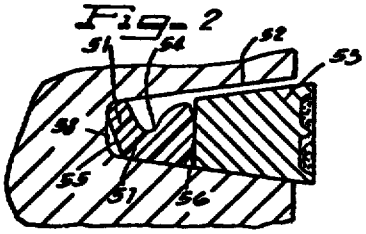
FIG. 2 is a view similar to FIG. 1 illustrating a different ring used in connection with a keystone piston ring.

FIG. 2 illustrates another embodiment of the ring 31. The ring 51 illustrated in FIG. 2 is shown fitted into a wedge-shaped groove 52 which receives a keystone ring 53. The ring 51, as the ring 31, is received radially inwardly of the compression ring 53. The ring 51 also has a central axial groove 54 extending into the ring from the top thereof. The radially inner wall 55 of the ring 51 is angled axially upward and radially inward to provide a sloping backface. The radially outer diameter face 56 of the ring is curved to give the ring a barrel face contour. The combination of the slanting backface 55 and the curved barrel face 56 allows the ring 51 to effectively seal the ring groove 52 with minimal normal contact between the ring 51 and the walls of the ring groove and the inner diameter of the compression ring. Further, due to the resiliency of the material of the ring 51 and the slanting inner diameter face 55 and barrel-shaped outer diameter face 56, the ring does not exert as large a circumferential expansion force as does the ring illustrated in FIG. 1. Further, some of the force of the compression gases may be utilized in deforming the inner peripheral portion 57 of the ring 51, thereby reducing the space 58 between the slanted face 55 and the bottom of the ring groove.

FIGS. 3 through 6 illustrate another embodiment of the plastic piston ring of this invention. The ring 61 has both top 62 and bottom 63 axial grooves. There is also an inner diameter groove 64 extending radially into the ring from the backface thereof. The outer diameter face 64 is axially straight and is designed to mate with the inner diameter of a conventional compression ring or rings.

Conventional piston rings have a radial gap therein to allow insertion into the piston ring groove. Such gaps provide an escape path for combustion gases. In order to close this gap, it has been suggested to place two axially thin compression piston rings in a single ring groove with their gaps circumferentially spaced from one another. However, during operation of the piston, the piston rings may move independently of one another and their gaps thereafter become aligned. When this occurs, the compression gases may escape axially through the aligned gaps.

Figure 3:
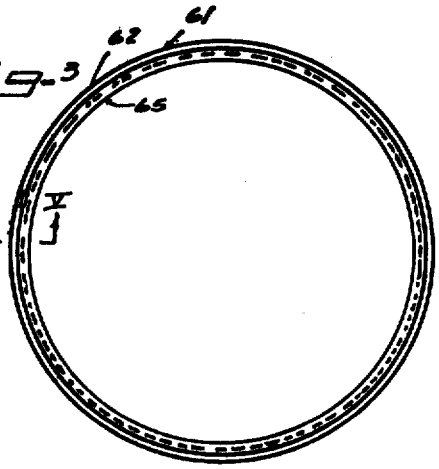
FIG. 3 is a top plan view of a modified piston ring of this invention.
Figure 4:
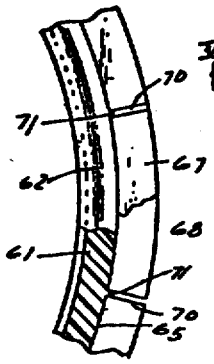
FIG. 4 is a partially sectional side plan view of the FIG. 3 embodiment of the ring of this invention.
Figure 5:
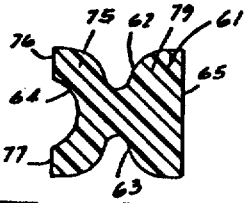
FIG. 5 is a cross-sectional view of the ring of FIG. 3, taken along the line V—V.
Figure 6:
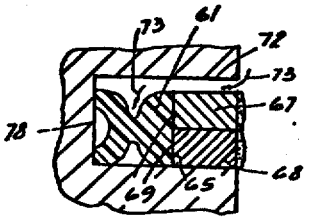
FIG. 6 is a fragmentary cross-sectional view of the ring of FIGS. 3, 4 and 5 received in a piston ring groove and used as an expansion ring for a pair of standard composition piston rings.

The plastic piston ring 61 retains the circumferential misalignment of such rings. As illustrated in FIG. 6, the ring 61 is placed radially inwardly of two conventional compression rings 67 and 68. The radially outer face 65 of the ring 61 abuts the inner diameter faces 69 of the compression rings 67 and 68. Because the ring 61 is made of a plastic material, portions of its outer diameter face 65 will extrude into the gaps 70 as illustrated in FIG. 3. The extrusion points 71 will lock the ring gaps 70 in circumferential misalignment and thereafter the piston rings 67 and 68 and the ring 61 will move in the groove 72 as a unit.

The ring 61 further acts to prevent compression gas blowby through the ring groove 72. As high-pressure gas enters the ring groove 72, as illustrated by the arrows 73, it will be trapped in the upper portion of the groove 72 by the ring 61. As the high-pressure gases contact the ring, they will enter the groove 62 acting against the radially inner portion 75 to force the inner diameter walls 76 and 77 against the backwall 78 of the ring groove. At the same time, they will increase the circumferential expansion force of the outer diameter wall 65 against the inner diameters 69 of the rings 67 and 68. Due to the provision of the three grooves 62, 63 and 64, the ring 61 is slightly compressible in both an axially downward and radially inward direction. Further, the presence of high-pressure gas in the groove 62 will force apart the radially inner portion 75 and the radially outer portion 79 of the ring 61 thereby creating both the sealing force against the backwall 79 and the expansion force against the compression rings 67 and 68. In this manner, the gas will be trapped in the ring groove. An additional feature is provided by grooving both the top and the bottom axial ends of the ring 61 in that the ring may be inserted in the ring groove with either of the grooves 62 or 63 on the top.

Figure 7:
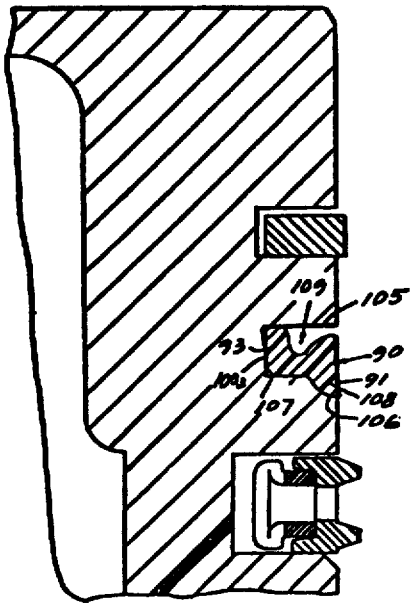
FIG. 7 is a fragmentary cross-sectional view of a piston equipped with one of the embodiments of the ring of this invention.
Figure 9:
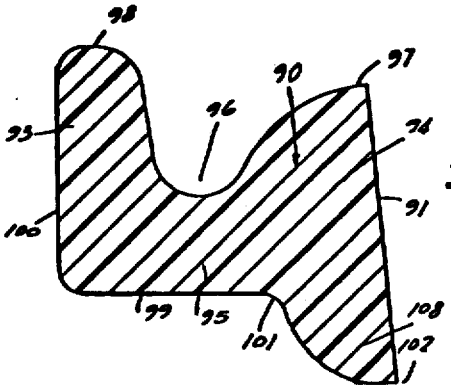
FIG. 9 is a cross-sectional view of the embodiment illustrated in FIG. 7.

FIGS. 7 and 9 illustrate another modification of the ring of this invention which is inserted in an especially cut ring groove. The ring 90 has an outer diameter face 91 adapted to contact the cylinder bore wall, thereby providing an oil scraping lip.

The ring has a radially inner axially extending portion 93 which is integral with a radially outer portion 94 through the radially extending bottom portion 95. A groove 96 extending into the ring from the top thereof separates the inner portion 93 from the outer portion 94.

The top 97 of the radially outer portion at the front face 91 is below the top 98 of the radially inner portion and the axial top surface of the radially outer portion 94 has an arcuate slope from the point 97 to the groove 96. The bottom 99 of the ring 90 extends radially outward from the backwall 100 to a point 101 beyond the groove 96. Thereafter, the bottom tapers arcuately axially downward and outward to the front face 91 so that the bottom portion of the radially outermost portion 94 extends axially beyond and below the remainder of the ring. The scraping face 91 is tapered radially inward from the bottom 102 to the top 97 thereof.

The piston groove 105 is a rectangular groove having a height slightly greater than the height of the radially inner portion 93 of the ring 90. A secondary stacked portion 106 of the groove 105 receives the axially extended bottom portion of the radially outer portion 94. The portion 106 of the groove is arcuately cut from the bottom 107 of the rectangular groove at the outer diameter thereof. The portion 106 is cut radially into the piston a distance slightly less than the thickness of the lip portion 108 of the ring formed by the bottom of the radially outer portion 94. In this manner, the portion 108 projects out of the ring groove to a point where it may contact the cylinder wall.

The backwall 100 of the ring 90 preferably bottoms against the backwall 100a of the ring groove 105 in a manner substantially the same as the ring 31 of FIG. 8.

When high-pressure compression gases flow into the ring groove 105 as illustrated by the arrow 109, they will encounter the groove 96 where they will press the face 91 against the cylinder wall. The taper of the face 91 allows the axially upper portion of the ring of be expanded against the cylinder wall when high-pressure gases are present in the groove 96. The pressure of the compression gases will also act in the groove 96 of the ring 90 to radially expand the same whereby the backwall 100 of the ring 90 will be forced into sealing engagement with the backwall 100a of the ring groove 105. The contact between the cylinder wall and the axially lower portion of the scraping face 91 allows the ring to function as an oil-scraping ring. The presence of high-pressure gases in the groove 96 will increase the contact pressure between the face 91 of the ring 90 and the cylinder wall. As the pressure in the groove 96 increases, the portion of the front face 91 of the ring 90 contacting the cylinder wall will increase as the ring 90 is circumferentially expanded. In this manner the ring 90 functions as an anti-blowby ring in that it seals escape paths through the ring groove 105 by contact with the axial end walls of the ring groove 105 and by sealing engagement with the backwall 100a of the groove. Further blowby between the piston head and the cylinder wall is minimized due to expansion pressure contact between the outer diameter face 91 of the ring 90 and the cylinder wall. In order to aid in effectuating this seal, the ring groove 105 is preferably equal to or just slightly greater than the height of the inner diameter portion 93 of the ring groove 90 so that the top thereof 98 may contact the axial end of the ring groove in response to the pressure of gases in the groove 96 when the backwall 100 of the ring 90 is bottomed against the backwall 100a of the ring groove.

Figure 10:
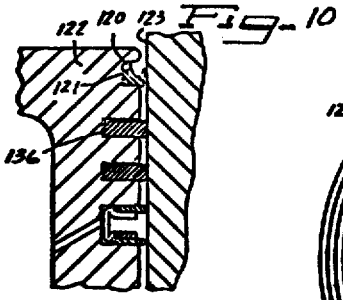
FIG. 10 is a fragmentary cross-sectional view of the ring area of a piston received in a cylinder, illustrating one embodiment of the continuous ring of this invention utilized for blowby control.
Figure 11:
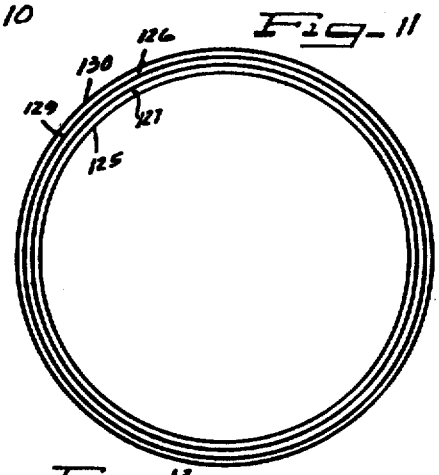
FIG. 11 is a top plan view of the ring illustrated in FIG. 10.
Figure 12:
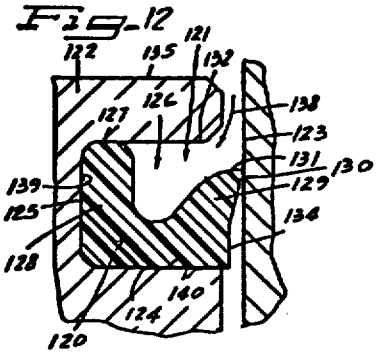
FIG. 12 is a fragmentary enlarged cross-sectional view of the top ring groove of FIG. 10, illustrating the ring.

FIGS. 10 through 13 illustrate another embodiment of the plastic piston ring of this invention. FIG. 10 illustrates the ring 120 received in a special top ring groove 121 in a piston 122. A portion of the ring rides against the cylinder wall 123.

The ring 120 is an annular continuous plastic piston ring having a flat bottom or axial end 124 and a straight axially extending backwall 125. An axially extending groove [126b] *126* projects into the ring from the top 127 thereof, dividing the ring into a radially inner portion 128 and a radially outer portion 129. The radially outer portion 129 terminates at its outer diameter with a cylinder wall engaging portion 130. The axial top end 131 of the radially outer portion 129 is below the top 127 of the radially inner portion 128 and is spaced from the top sidewall 132 of the piston groove 121. The axial height of the ring 120 at the radially inner portion is approximately the same as the height of the groove. In this manner, the upper portion of the radially outer portion serves as a sealing lip with the bottom axial portion thereof cut back as at 134 to a reduced diameter portion so that the cylinder engaging portion 130 projects radially beyond the remainder of the ring.

The groove 121 is in close-spaced relation to the top 135 of the piston 122 and is located above the normal position of the top ring groove 136 of a standard piston. The ring 120 serves as an anti-blowby ring reducing harmful exhaust emissions as well as preventing entrance of uncombusted fuel and oxygen mixtures into the space between the cylinder wall 123 and the piston 122 where they would normally not be combusted due to the smallness of the area.

In addition, the ring acts in the same manner as previously described rings. As high-pressure combustion gases force their way between the top of the piston and the cylinder wall, they are entrapped in the groove 126 as indicated by the arrow 138. Their effect upon the groove will be to force the inner diameter portion 128 tightly against the back 139 of the piston groove and to force the bottom wall 124 of the ring against the bottom wall 140 of the groove, thereby preventing escape of gases around the ring in the groove. Further, they will force the cylinder wall engaging portion 130 of the outer diameter portion 129 tighter against the cylinder wall 123 thereby cutting off the flow at the outer diameter. In the absence of high-pressure gases in the groove 126, the contact between the ring and the cylinder wall will be less thereby reducing friction. Therefore, contact between the cylinder wiping portion 130 and the cylinder wall 123 will be greatest during the power and compression strokes and smallest during the intake stroke. During the exhaust stroke, there will be a slight expansion effect on the ring.

Figure 13:
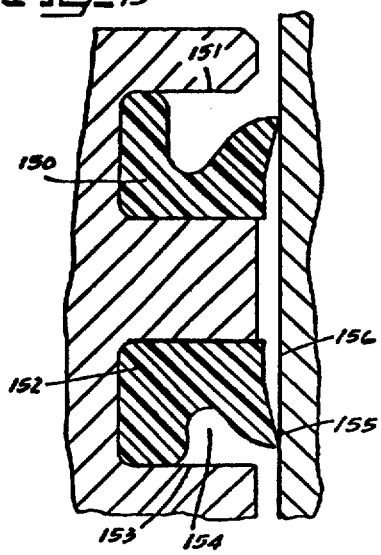
FIG. 13 is a fragmentary cross-sectional view of the ring grooves of a modified piston illustrated as received in a cylinder wall and showing other combination uses for the ring of the invention.

FIG. 13 illustrates a dual ring, dual groove arrangement where one of the rings 150 identical to the ring 120 is inserted in a top groove 151 identical to the groove 121. A secondary ring 152 which may be identical to the rings 150 and 120, or which may be as illustrated having a shallower groove 154, is inserted in a lower ring groove 153. This ring acts as an oil control ring with the cylinder engaging lip 155 acting against the cylinder wall 156 to wipe excess oil therefrom and to prevent excess amounts of oil from being forced upwardly to the upper reaches of the cylinder where they could be combusted to form hydrocarbon deposits on the cylinder wall.

Figure 14:
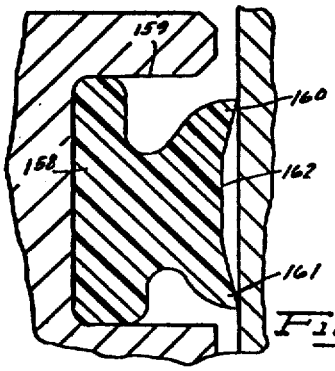
FIG. 14 is a fragmentary cross-sectional view of a ring groove of a modified piston received in the cylinder, illustrating another embodiment of this invention.

FIG. 14 illustrates a single ring 158 received in a wider top piston ring groove 159. The single ring 158 functions as a combination of the rings 150 and 152 and has two axially spaced cylinder engaging lips 160 and 161 separated by a reduced diameter portion 162 which does not normally contact the cylinder wall. In this embodiment, the lower lip 161 functions as an oil control lip while the upper lip 160 functions in the manner of the cylinder engaging portion 130 of the ring 120.

It can therefore be seen from the above that our invention provides an improved plastic piston ring which reduces the exhaustion of harmful internal combustion engine emission products by reducing gas blowby between the piston and the wall of the cylinder in which the piston operates. In some embodiments, the ring is placed behind a standard combustion ring or ring set and transforms the axially directed flow force of the combustion gases into a radial pressure which seals the interior of the piston ring groove to prevent gas blowby therethrough and which also increases the sealing [contract] *contact* between the compression ring and the cylinder wall. In other embodiments, the ring can directly engage the cylinder wall with a given standard pressure and in the presence of high-pressure gases will contact the cylinder wall with a greater pressure while at the same time sealing the groove in which it is received to prevent internal groove blowby.

Although the teachings of our invention have herein been discussed with reference to specific theories and embodiments, it is to be understood that these are by way of illustration only and that others may wish to utilize may invention in different designs or applications.

We claim as our invention:

[1. A piston and piston ring combination for use in internal combustion engines comprising a piston having a plurality of ring grooves therein, a plurality of piston rings in said grooves, at least one of said piston rings having its inner diameter spaced from the inner diameter of a ring groove, a plastic piston ring positioned radially interiorly of said piston ring in the groove, said plastic piston ring comprising an annular ring of plastic material having inner and outer diameters and an axial thickness, an axially extending groove extending into said plastic piston ring from the top thereof, said axial groove terminating in spaced relation to the bottom of the said plastic piston ring, said groove dividing said ring into radially inner and radially outer spaced-apart portions in the area of the axial groove, the outer diameter of the radially outer portion abutting the inner diameter of the said one piston ring, the radially outer portion of the said plastic piston ring having an axial height less than the axial height of the said ring groove, and the said radially outer portion movable with respect to the radially inner portion in dependent response to the presence of a high pressure in the said axial groove.]

[2. The combination of claim 1 wherein the said plastic piston ring is a 360° continuous ring.]

[3. The combination of claim 2 wherein the said plastic piston ring is constructed of a polyimide resin which is structurally stable at a temperature greater than 500° F.]

[4. A piston and piston ring combination for use in internal combustion engines comprising: a piston, at least one ring groove in said piston, said ring groove having a metal split piston ring received therein, said metal piston ring having an axial height less than the height of the ring groove, a plastic piston ring concentric with said metal ring groove, a plastic piston ring concentric with said metal ring received in said ring groove radially interiorly of said metal ring, said plastic piston ring being substantially U-shaped in cross section with the opening of the U extending upwardly, the outer diameter leg of the said U having an axial height less than the axial height of the ring groove, the inner diameter leg of the said U having an axial height greater than the outer diameter leg, said plastic piston ring bottomed in the said ring groove, the radially outer leg of the plastic piston ring circumferentially contacting the inner diameter of the said metal piston ring and the said radially outer leg movable with respect to the said radially inner leg in dependent response to the presence of pressure in the opening of the said U-shaped ring, whereby high-pressure gases entering the ring groove above the said metal piston ring will enter the said opening and press the inner diameter leg into sealing engagement with the bottom of the ring groove and the outer diameter leg into sealing engagement with the inner diameter of the metal piston ring thereby entrapping the said gas in the said ring groove.]

[5. The combination of claim 4 wherein the outer diameter of the said plastic piston ring is circumferentially curved in an axial direction.]

[6. The combination of claim 4 wherein the outer diameter of the said plastic piston ring is circumferentially tapered in an axial direction.]

[7. The combination of claim 4 wherein the inner diameter of the said plastic piston ring is axially tapered.]

[8. The combination of claim 4 wherein the inner diameter of said plastic piston ring is axially curved.]

[9. A piston and piston ring combination for use in internal combustion engines comprising: a piston having at least one ring groove therein, a plurality of axially thin split annulus piston rings received in said groove projecting radially beyond said groove, said piston rings positioned one atop the other in said groove, the inner diameters of said piston rings terminating in spaced relationship to the bottom of said groove, a plastic piston ring received in said groove radially inwardly of said metal piston ring, the said plastic piston ring having its inner diameter bottomed on the bottom of the ring groove and its outer diameter contacting the inner diameters of the said metal piston rings, an axially extending groove projecting into the said plastic piston ring intermediate the inner and outer diameters thereof, the said axial groove projecting into the said ring from the top axial end thereof and terminating in spaced relationship to the bottom axial end thereof, the said plastic piston ring resilient whereby the outer diameter is movable with respect to the inner diameter in dependent response to the presence of high pressure fluid in the said axial groove.]

[10. The combination of claim 9 wherein portions of the material of the said plastic piston ring extend from its outer diameter into the gaps in the split annulus metal rings, the said gaps being circumferentially spaced from one another whereby the said metal rings are restrained against independent rotation with respect to one another.]

[11. The combination of claim 10 wherein the said plastic piston ring is a 360° continuous ring constructed of a high-temperature plastic.]

[12. The combination of claim 10 wherein the plastic piston ring has a radial groove in the ring from its inner diameter, the said ring groove positioned intermediate the axial ends of the said plastic piston ring.]

[13. The combination of claim 12 wherein the said plastic piston ring has a second axial extending groove positioned intermediate the inner and outer diameters thereof extending into the ring from the bottom axial end thereof and the said radial groove and axial groove bottom in spaced relationship from one another.]

[14. In an internal combustion engine having at least one piston reciprocatingly positioned in a cylinder, the piston having ring grooves therearound with metal piston rings therein, the improvement of at least one of said grooves having a plastic piston ring received therein positioned radially interiorly of the metal piston ring, said plastic piston ring being resilient and having a pressure-receiving axial groove therein, the plastic piston ring being responsive to the presence of pressures in said ring groove radially behind the said metal ring by sealing contact between the plastic piston ring and the backwall of the ring groove and inner diameter of the metal ring.]

*15. A piston and piston ring combination for use in an internal combustion engine comprising a piston movable in opposite directions in a cylinder and having at least one ring groove therein, a plurality of axially thin metal piston rings received in said groove one atop the other and projecting radially beyond said groove, each piston ring being split axially so as to have a circumferential gap, the gaps in said piston rings being circumferentially spaced, radially inner peripheries of said piston rings terminating in spaced relationship to a radially inner periphery of said groove, an expander ring for sealingly engaging the inner periphery of said groove and for sealingly engaging the inner peripheries of said piston rings and for restraining said piston rings against independent rotation with respect to one another during movement of the piston in said opposite directions, said expander ring comprising a one-piece body of elastomeric material that is stable at temperatures up to at least* 900° F. *which may be present in an internal combustion engine during its operation, said expander ring body having a radial cross-section which includes an annular radially inner portion to sealingly engage said radially inner surface of the groove in the piston, an annular radially outer portion to sealingly engage radially inner surfaces of the piston rings and providing a single annular area of sealing engagement with the inner surfaces of the piston rings which spans each joint between abutting radially extending side surfaces of the piston rings and an annular connector portion which is disposed between and connects said inner and outer portions of said expander ring body, an axially extending groove projecting into said expander ring intermediate the inner and outer diameters thereof, the said axial groove projecting into said ring from the top axial end thereof and terminating in spaced relationship to the bottom axial end thereof, said expander ring having an axial extent which is at least as great as a major portion of the combined axial extents of the piston rings so that said single annular area of sealing engagement will have an axial extent which is at least as great as a major portion of the combined axial extents of the inner surfaces of the piston rings and said expander ring will be extruded radially into the gap in each piston ring to hold each piston ring against circumferential movement relative to the other.*

*16. A piston and piston ring combination of claim 15 wherein the said expander ring is a* 360° *continuous ring.*

*17. A piston and piston ring combination as defined in claim 15 wherein said annular area of sealing engagement is cylindrical and extends from axially opposite edges of said annular radially outer portion.*

*18. A piston and piston ring combination as defined in claim 15, 16 or 17 wherein a radially extending cicumferential groove is formed in the radially inner portion of the expander ring body intermediate radially inner axial ends of said expander ring, said circumferential groove opening toward the bottom of the ring groove.*

*19. A piston and piston ring combination as defined in claim 15, 16 or 17 wherein the expander ring is constructed of a polyimide resin.*

*20. A piston and piston ring combination for use in an internal combustion engine, comprising a piston movable in opposite directions and having at least one ring groove therein, a plurality of axially thin metal piston rings received in said groove one atop the other and projecting radially beyond said groove, each piston ring being split axially so as to have a cicumferential gap, the gaps in said piston rings being circumferentially spaced, radially inner surfaces of said piston rings terminating in spaced relationship to the bottom of said groove, a continuous annular expander ring received in said groove radially inwardly of said piston ring, said expander ring being formed from a resilient high temperature plastic stable at temperatures from 500° F. to 900° F. encountered in an internal combustion engine and having a radially inner surface sealingly bottomed on said bottom of the ring groove and a radially outer surface contacting the inner surfaces of said piston rings, a first annular groove projecting axially into said expander ring intermediate the radially inner and outer surfaces thereof from a top axial end thereof and terminating in spaced relationship to a bottom axial end thereof thereby to provide radially inner and radially outer portions of the expander ring, a radial groove formed in the radially inner surface of the expander ring intermediate the axial ends of said ring, a second axially projecting annular groove positioned intermediate the radially inner and radially outer surfaces of the expander ring and extending into the ring from the bottom axial end thereof, said radial groove and axially projecting grooves terminating in spaced relationship from one another, the radially outer surface of said expander ring being a continuous cylindrical surface for sealing engagement with the inner surfaces of the piston rings and spanning each joint between abutting radially extending surfaces of the piston rings, said cylindrical outer surface having an axial extent which is substantially the same as the combined axial extent of the inner surfaces of said piston rings, and portions of the material of the said expander ring extending from the outer surfaces of the expander ring into the gaps in the split piston rings whereby said piston rings are restrained against rotation with respect to one another.*

*21. A piston and piston ring combination as defined in claim 20 wherein said expander ring is constructed of a polyimide resin.*

* * * * *